(12) United States Patent
Baker et al.

(10) Patent No.: US 7,364,766 B2
(45) Date of Patent: Apr. 29, 2008

(54) TOASTED FLAVOR ADDITIVE AND METHOD OF MAKING

(75) Inventors: Sheri Lynn Baker, Dallas, TX (US); John Mampra Mathew, Plano, TX (US); Renu Mathew, Plano, TX (US); Bruce Edward Rogers, Irving, TX (US)

(73) Assignee: Frito-Lay North America, Inc., Plano, TX (US)

( * ) Notice: Subject to any disclaimer, the term of this patent is extended or adjusted under 35 U.S.C. 154(b) by 0 days.

(21) Appl. No.: 10/683,967

(22) Filed: Oct. 10, 2003

(65) Prior Publication Data

US 2005/0079269 A1    Apr. 14, 2005

(51) Int. Cl.
    A21D 10/00    (2006.01)
(52) U.S. Cl. .................. 426/622; 426/458; 426/466
(58) Field of Classification Search ............. 426/622, 426/443, 458, 496, 559, 560, 466
    See application file for complete search history.

(56) References Cited

U.S. PATENT DOCUMENTS

| 4,806,377 A * | 2/1989 | Ellis et al. ............ 426/549 |
| 5,532,013 A | 7/1996 | Martinez-Bustos et al. |
| 6,022,567 A | 2/2000 | Lecouteux et al. |
| 6,025,011 A | 2/2000 | Wilkinson et al. |
| 6,165,530 A | 12/2000 | Mathew et al. |
| 6,190,709 B1 | 2/2001 | Schoenmaker et al. |
| 6,265,013 B1 | 7/2001 | Martinez-Montes et al. |
| 6,482,459 B1 | 11/2002 | Anderson |
| 6,516,710 B1 | 2/2003 | Knight et al. |
| 6,572,910 B2 | 6/2003 | Lanner et al. |

FOREIGN PATENT DOCUMENTS

| WO | WO 01/91561 A2 | 12/2001 |
| WO | WO 01/91562 A2 | 12/2001 |
| WO | WO 02/07536 A2 | 1/2002 |

OTHER PUBLICATIONS

"A Dinner Experiment" http://groups-beta.google.com/group/rec.food.cooking Mar. 28, 2003.*
"Salmon Patties" http://groups-beta.google.com/group/rec.food.cooking Feb. 6, 2000.*
"Dried Food Products" http://web.archive.org/web/20020308135438/http://www.vegetables-fruits.com/44.htm 03/0882002.*
"Principles of CEREAL," Science and Technology, Second Edition, by R. Carl Hoseney, Department of Grain Science and Industry, Kansas State University, Manhattan, Kansas, no date noted.
"p Value," found at http://evidence.ahc.umn.edu/pvalue.htm, dated Sep. 4, 2003.
"Manufacture of read-to-eat breakfast cereals," found at http://designstudio.mae.cornell.edu/realization/cereal-.../4-manufacture-breakfast-cereals.htm dated Sep. 5, 2003.
"How are breakfast cereals made?" found at http://www.gograins.grdc.com.au/grainsnutrition/ns/10_2.html, dated Sep. 5, 2003.
"Food Product Design Tortilla Chips, Jan. 2000—Applications," by Ronald C. Deis, Ph.D., Contributing Editor, found at http://foodproductdesign.com/archive/2000/0100ap.html, dated Jun. 19, 2003.
Industrial ovens manufacturers directory including industrial oven, vacuum, commercials, found at http://www.industrial-ovens.net, dated Jun. 20, 2003.
"Ovens in Commercial Food Service Operations," by Pacific Gas and Electric Company, dated May 1997.
"Characteristics of Tortillas Prepared from Dry Extruded Masa Flour Added with Maize Pericarp," by V.G. Arambula, J. Gonzalez-Hernandez, M.E. Moreno, and F.C.A. Ordorica dated Nov. 4, 2002.
"Chemical and physicochemical properties of masa and dry masa flour," AACC 2000 Annual Meeting, Nov. 5-9, 2000, Kansas City, Missouri.
"What's in a Kernel of Corn?" Ohio Corn Marketing Program, found at http://www.ohiocorn.org/about_gen_kernel.htm, dated May 21, 2003.
"Nutritional Analysis of a New Mexico Blue Corn and Dent Corn Kernels," Guide H-233, by George W. Dickerson, Extension Horticulture Specialist, Cooperative Extension Service, College of Agriculture and Home Economics, dated Feb. 2003.
"Masa and Masa Harina," by CuisineNet Diner's Digest, found at http://www.cuisinenet.com/digest/ingred/masa.shtml, dated May 21, 2003.

* cited by examiner

*Primary Examiner*—Arthur L. Corbin
(74) *Attorney, Agent, or Firm*—Colin P. Cahoon; Carstens & Cahoon, LLP

(57) ABSTRACT

A novel toasted flavor additive for enhancing the toasted flavor and appearance of food products. In accordance with one embodiment of the present invention, toasted corn flavor additive ("TCF") is made by the steps of cooking whole corn kernels in a solution of lime and water; steeping the corn; draining and washing the corn; grinding, sheeting and cutting the corn into pieces; toasting the pieces until significant browning has occurred beyond the level normally associated with consumed masa products; and grinding the toasted pieces into a powder that can be administered as toasted corn flavor additive.

13 Claims, 5 Drawing Sheets
(1 of 5 Drawing Sheet(s) Filed in Color)

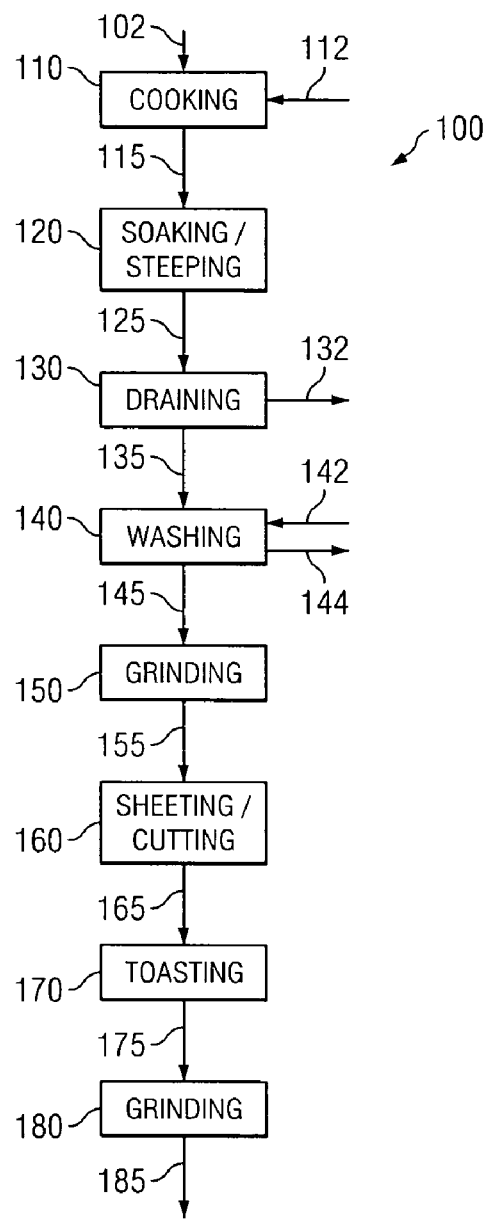
FIG. 1
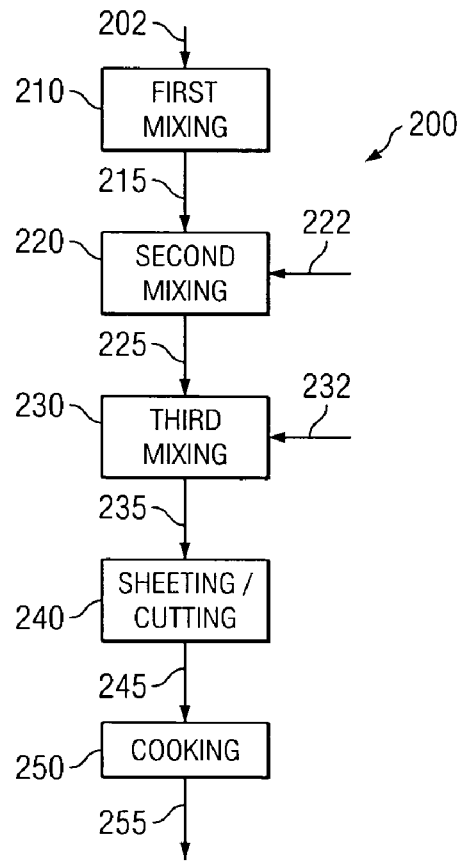
FIG. 2
| PRECONDITIONED MASA | LB |
|---|---|
| DRY MASA | 10.25 |
| WATER | 2.25 |
| TOTAL | 12.50 |
FIG. 3a
| DOUGH COMPOSITION | LB |
|---|---|
| PRECONDITIONED MASA | 12.50 |
| STARCH | 7.00 |
| TCF | 1.32 |
| EMULSIFIER | 0.055 |
| WATER | 4.50 |
| OTHER | 1.00 |
| TOTAL | 25.38 |

| FRIED CHIP COMPOSITION | PERCENT |
|---|---|
| DRY MASA | 36.4 |
| STARCH | 26.7 |
| TCF | 3.7 |
| EMULSIFIER | 0.06 |
| WATER | 1.2 |
| OIL | 27.9 |
| OTHER | 3.9 |
| TOTAL | 100.0 |

*FIG. 3b*

|  | STANDARD TORTILLA CHIP | | UNTOASTED DRY MASA CHIP | | P-VALUE |
|---|---|---|---|---|---|
|  | MEAN | STANDARD ERROR | MEAN | STANDARD ERROR | |
| TOASTED FLAVOR | $^a$4.39 | 0.10 | $^b$3.94 | 0.10 | 0.01 |

*FIG. 4a*

|  | STANDARD TORTILLA CHIP | | UNTOASTED, DRY MASA CHIP WITH TCF ADDITIVE | | P-VALUE |
|---|---|---|---|---|---|
|  | MEAN | STANDARD ERROR | MEAN | STANDARD ERROR | |
| TOASTED FLAVOR | $^a$2.4 | 1.12 | $^a$2.2 | 1.09 | < 0.001 |
| OVERALL ACCEPTABILITY | $^a$6.5 | 2.02 | $^a$6.8 | 1.86 | < 0.001 |

*FIG. 4b*

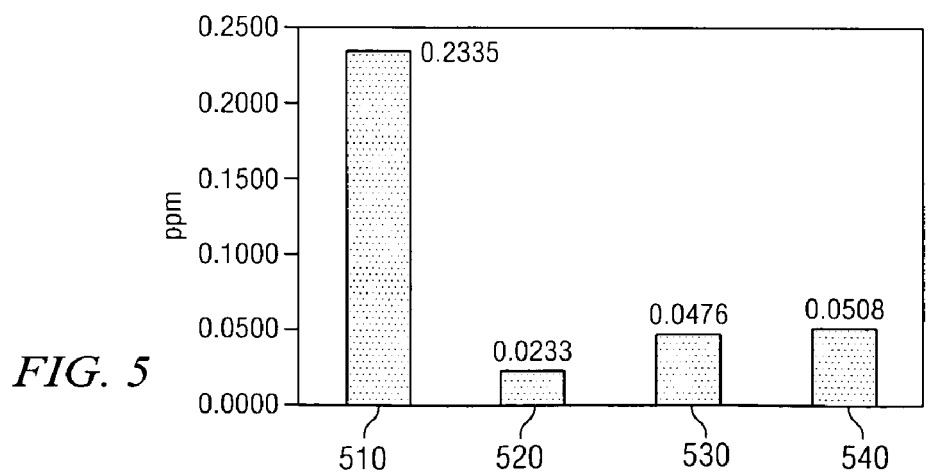

*FIG. 5*

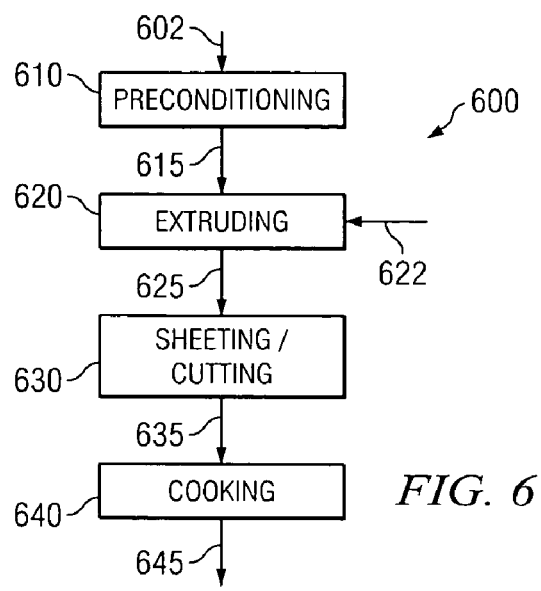
FIG. 6
| SAMPLE | MOISTURE PERCENTAGE | OIL PERCENTAGE | L-VALUE |
|---|---|---|---|
| CARGILL FLAVOR ENHANCER | 7.44 | 24.20 | 64.1 |
| LIFELINE MASA | 9.84 | 3.85 | 78.4 |
| TOASTED CORN FLAVOR | 1.70 | 3.78 | 49.2 |
FIG. 7
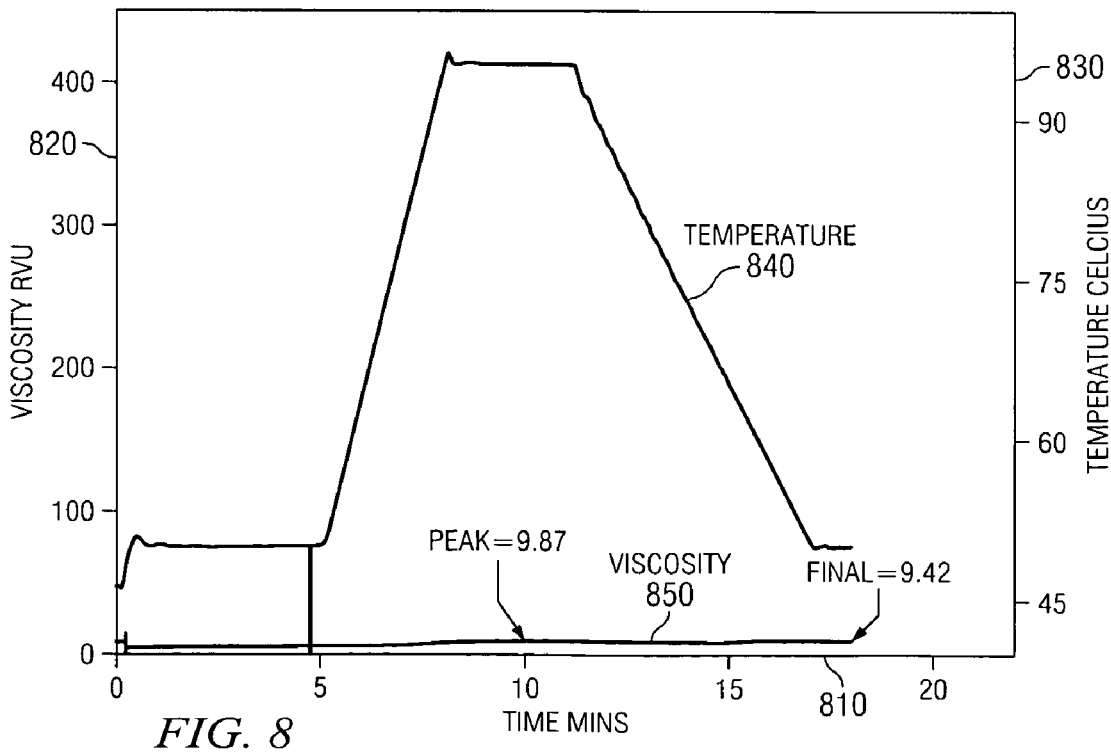
FIG. 8

TOASTED FLAVOR ADDITIVE AND METHOD OF MAKING

BACKGROUND

1. Technical Field

The present invention relates to a novel flavor additive having a toasted corn flavor, a method for making the additive, and novel food products incorporating the additive. The novel flavor additive can be used to enhance or impart a toasted corn flavor to various food products such as corn tortilla chips made from dry masa flour.

2. Description of Related Art

Corn and its derivative products were principle food sources for the pre-Columbian civilizations of the New World. Even today, corn is a staple source of food in Mexico and in parts of Central America, and there is global demand for corn products such as corn chips, tortilla chips, tacos, tostadas and enchiladas. Many of these corn products are derived from masa dough ("masa").

Corn products can be made from either wet masa, often called fresh masa, or dry masa flour (dry masa). In general, dry masa produces less desirable, lower quality products than wet masa. For example, dough derived from dry masa or low moisture-content masa tends to be less plastic and cohesive than wet masa or high-moisture-content masa. The more desirable wet masa, however, deteriorates quickly due to its high moisture content. Consequently, dry masa is often used to make corn products because of its longer shelf-life and transportability. Manufacturers can simply rehydrate dry masa to create masa dough rather than nixtamilize and grind fresh corn. Furthermore, dry masa may be more suitable in cooking applications where it is more desirable for the masa dough to be buoyant in cooking oil, as dough made from dry masa tends to be less dense than dough made from wet masa.

To understand the differences between wet and dry masa, it is helpful to understand how masa is formed.

The traditional method for processing fresh corn to form masa dough is called nixtamilization and dates back to the pre-Columbian era of the Aztec and Maya people in Mesoamerica. In the traditional nixtamilization process, fresh whole-kernel corn is first soaked in a solution of water and lime (calcium hydroxide) and then partially cooked at or near the boiling point for a short time depending on the hardness of the corn. The corn is then steeped in the lime-water solution and is allowed to cool for about 8-12 hours in order to loosen and degrade the pericarp (or bran) which is the outer, fibrous layer of a corn kernel. Cooking and steeping in alkaline solution causes partial dissolution of the cuticle and other pericarp layers as well as swelling and weakening of cell walls and fiber components. The corn kernels are then drained of the cooking liquor (called "nejayote), which contains loosened pericarp and other dissolved or suspended particles, and the corn kernels are washed to remove excess lime and loose particles. Typically, up to 15% by weight of the total corn fraction is lost during the cooking and washing steps. The corn kernels are then stone-ground to disrupt the starch-containing cell structures. The ground, wet mixture can be mixed with water to form fresh masa dough, or it can be dehydrated and ground to form dry masa flour. Dry masa flour can be rehydrated at a later time to form masa dough. See Hoseney, R. C., *Principles of Cereal Science and Technology*, 2nd ed., American Association of Cereal Chemists, Inc., St. Paul, Minn., USA, pp. 349-351 (1994).

The dehydration of wet masa to form dry masa flour followed by rehydration to reform masa dough causes further degradation and deterioration of the cell walls, proteins and natural gums that give masa dough its plasticity and texture. This degradation also causes some of the corn and lime flavor to be lost. Thus, while dry masa has a longer shelf-life, is more easily transported than wet masa, and is used to make finished product more quickly, products derived from dry masa tend to have a less desirable, lighter corn flavor, and their texture is often not as desirable. Furthermore, when dry masa is used to make corn tortilla chips, the chips tend to lack the toast points (one source of dark speckles) that naturally form on the surface of similar chips derived from wet masa. This is because dough derived from dry masa flour generally has less moisture than dough derived from fresh masa, which in turn means that dry-masa chips undergo less baking or toasting than fresh masa chips during the cooking process. Research has shown that many consumers prefer corn chips having randomly dispersed toast points to corn chips having a more consistent, monotone color. Many consumers also prefer corn chips having a toasted corn flavor rather than chips having a light corn flavor.

Furthermore, there are certain manufacturing circumstances where masa dough preforms must be fried without first toasting the preforms, regardless of whether they are derived from wet or dry masa. Consider, for example, an instance where it is desirable to fry preforms into a particular shape. In such circumstances, those preforms cannot be toasted before frying because toasting would render the preforms too stiff to conform to fryer molds. The resulting products therefore lack the toasted corn flavor and appearance that is often desired in corn products.

Corn flavor additives have been used to help improve the flavor of corn products made from masa flour. However, prior art corn flavor additives are typically mere by-products of processes for making cornstarch. Because the germ portions of corn are often discarded in the cornstarch process, prior art corn flavor additives and methods for preparing such additives simply use the germ components that otherwise would have been discarded. One such prior art corn flavor additive is InnovaSure Masa-thentic #18 by Cargill Foods, which consists of lime-processed corn germ. Furthermore, prior art corn flavor additives impart only a more concentrated corn germ flavor and do not give products a more toasted flavor. While prior art corn germ additives help enhance the flavor of foods, they fail to impart a toasted flavor or give products the appearance of having toast points.

Consequently, a need exists for an additive for enhancing the toasted corn flavor and visual characteristics of corn products made from masa dough. Such an additive should enhance the toasted corn flavor in corn products such as corn tortilla chips made from masa flour, and it should give products the appearance of having natural toast points. This additive should impart a toasted corn flavor and appearance for products made without the benefit of a toasting stage. Such an additive should also be easily manufactured and readily incorporated into existing processes for making corn products from masa dough.

SUMMARY OF THE INVENTION

In accordance with one embodiment of the present invention, toasted corn flavor additive ("TCF") is made by the following steps: 1) whole corn kernels are cooked in a solution of lime and water; 2) the corn is steeped and allowed to cool; 3) the corn is drained and washed; 4) the corn is ground, sheeted and cut into pieces; 5) the pieces are toasted until significant browning has occurred beyond the level normally associated with consumed masa products; and 6) the toasted pieces are then reground into particles which can then be administered as toasted corn flavor additive. These steps can be performed in either a batch or continuous process.

The resulting TCF particles have the following characteristics: an ash content higher than that normally found in consumable products, a moisture content of about 0.1% to about 15% by weight, more preferably from about 0.5% to about 6%; an oil content of about 2.0% to about 5.0% by weight, more preferably from about 3.0% to about 4.0%; and a distribution of particles sizes such that roughly 75% or more of the particles have U.S. mesh screen sizes between 16 and 50 (300 to 1180 microns), more preferably a distribution of coarse particles (or particulates) having an average U.S. mesh size of 20 (850 microns) and fine particles (or particulates) having an average U.S. mesh size of 40 (425 microns).

In one embodiment, a fried, untoasted corn masa product containing TCF was formed by mixing, sheeting, cutting, and frying a mixture of 12.5 lbs of preconditioned dry masa, 7.0 lbs of starch, 1.32 lbs of TCF additive, 0.06 lbs of emulsifier, 4.50 lbs of water, and 1.0 lbs of other ingredients. The resulting product had the following composition (percentages expressed by weight): 36.4% dry corn masa; 26.7% starch; 3.7% TCF; 0.05% emulsifier; 27.9% oil; a moisture content of 1.2%; and other additives for the remaining fraction. In flavor optimization method tests for toasted corn flavor, the fried, untoasted TCF-enhanced product came in at parity with a control sample of tortilla chips that were formed from wet masa, toasted and fried in a typical manner. In addition, product samples of untoasted, TCF-enhanced corn masa products contained twice as much dimethyl-ethyl-pyrazine (an aromatic compound associated with toasted corn flavor) as control samples of similar products made without TCF.

Depending on the particle size of the TCF additive used and the method used to apply it to the product to be enhanced, the TCF additive can either give the finished product the appearance of having natural toast points dispersed throughout, give the product a consistent darker color, or both. This is because larger particles of TCF also serve as artificial toast points. TCF particles also enhance the toasted corn flavor of products made from dry or wet masa.

TCF-enhanced dry-masa snack products made in accordance with the present invention have visual and flavor characteristics that are more desirable than non-TCF-enhanced dry-masa snack products. Unlike traditional dry-masa snack products, which tend to have bland corn flavors and homogenous colors, TCF-enhanced dry-masa snack products have a toasted corn flavor and contain dark specks (artificial toast points comprising dispersed TCF particles) that resemble toast points.

While the preferred embodiments disclosed herein relate specifically to corn products, the novel method for adding or enhancing a toasted flavor also applies to other grains and starch-based foods. Substances amenable to the novel toasted-flavor-enhancing method include but are not limited to: oats, barley, rice, wheat, beans, corn flour, masa corn flour, corn grits, corn meal, tapioca, potato flour, potato granules, potato flanules, potato flakes, as well as modified starches, native starches, and dehydrated starches, starches derived from tubers, legumes and grain, for example corn wheat, rye, rice, waxy corn, oat, cassava, barley, waxy barley, waxy rice, glutinous rice, sweet rice, amioca, potato, waxy potato, sweet potato, sago, waxy sago, pea, sorghum, amaranth, tapioca, and mixtures thereof. Furthermore, this method for enhancing the toasted flavor of foods also encompasses the recycling and toasting of scraps, lace, and waste from a given food manufacturing line in order to form a toasted-flavor additive.

The above as well as additional features and advantages of the present invention will become apparent in the following written detailed description.

BRIEF DESCRIPTION OF THE DRAWINGS

The patent or application file contains at least one photograph executed in color. Copies of this patent or patent application publication with color drawing(s) will be provided by the Office upon request and payment of the necessary fee.

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 1 is a flow chart of a process for making a toasted corn flavor additive in accordance with one or more embodiments of the present invention;

FIG. 2 is a flow chart of a method for making corn tortilla chips from dry masa flour and using TCF to enhance the flavor and appearance of such chips in accordance with one or more embodiments of the present invention;

FIG. 3 is a chart showing the raw materials and amounts that were used to make a sample of fried, untoasted corn chips having TCF additive in accordance with one embodiment of the present invention;

FIGS. 4a and 4b are charts showing the comparative consumer test results of flavor optimization method tests for toasted flavor in samples of standard tortilla chips, untoasted dry masa chips without TCF additive, and untoasted dry masa chips with TCF additive;

FIG. 5 is a graph of dimethyl-ethyl-pyrazine concentrations in samples of standard tortilla chips, untoasted dry masa chips without TCF additive, and untoasted dry masa chips with TCF additive;

FIG. 6 is a flow chart of a method for making an extruded corn snack food from dry masa flour and using TCF to enhance the flavor and appearance of such snack food in accordance with one or more embodiments of the present invention;

FIG. 7 is a chart comparing the moisture, oil, and color levels of one embodiment of TCF, Cargill Flavor Enhancer #10, and Lifeline Masa;

FIGS. 8, 9 and 10 are charts showing the results of rapid-viscosity-analysis tests performed on samples of Cargill Flavor Enhancer #10, Lifeline Masa, and TCF additive made in accordance with the present invention, respectively.

DETAILED DESCRIPTION

Toasted Flavor Additives

Figure 9:
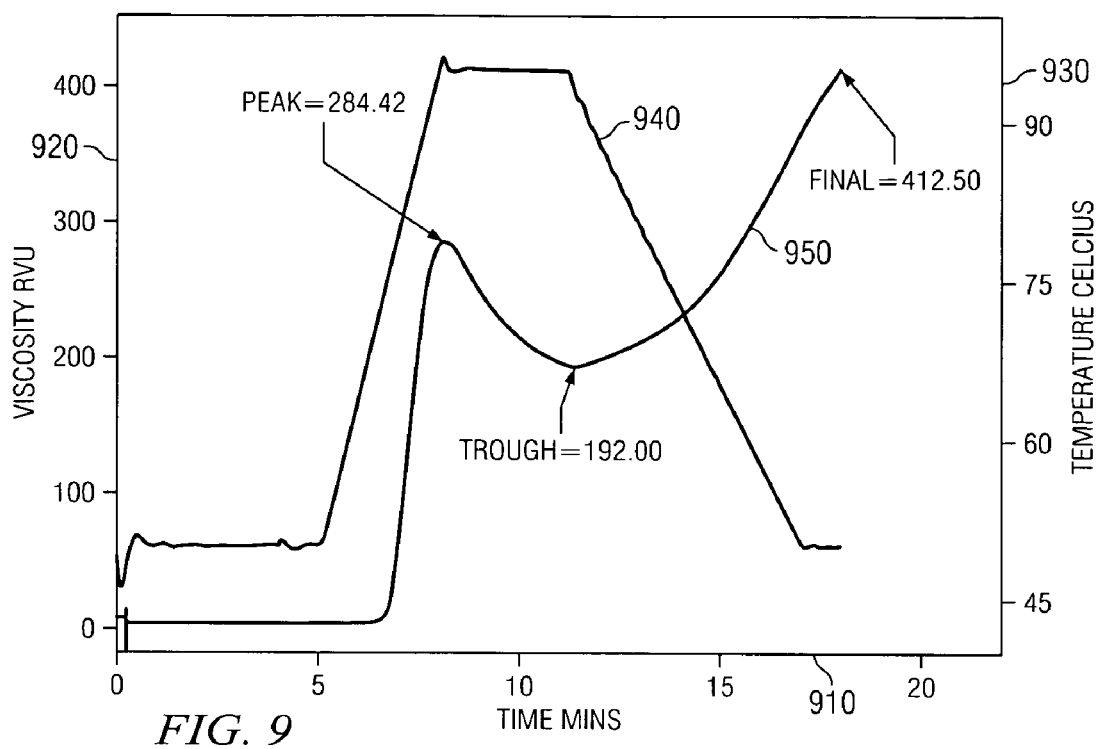

Many products made from various grains and other starch-based foods lack a toasted flavor and could benefit from an enhanced toasted note. While the example additives and methods for making and using such additives disclosed herein relate specifically to corn products, the methods described herein also apply to other grains and starch-based foods. Substances amenable to the disclosed toasted-flavor-enhancing methods include but are not limited to: oats, barley, rice, wheat, beans, corn flour, masa corn flour, corn grits, corn meal, tapioca, potato flour, potato granules, potato flanules, potato flakes, as well as modified starches, native starches, and dehydrated starches, starches derived from tubers, legumes and grain, for example corn wheat, rye, rice, waxy corn, oat, cassava, barley, waxy barley, waxy rice, glutinous rice, sweet rice, amioca, potato, waxy potato, sweet potato, sago, waxy sago, pea, sorghum, amaranth, tapioca, and mixtures thereof. "Starch-based materials" refer to naturally occurring, high polymeric carbohydrates in either natural, dehydrated or flour form. Furthermore, this method for enhancing the toasted flavor of foods also encompasses the recycling and toasting of scraps, lace, and waste from a given food manufacturing line in order to form a toasted-flavor additive.

Toasted Corn Flavor Additive

While the prior art methods for making a corn flavor additive use only the germ portions of corn kernels, a method in accordance with a preferred embodiment of the present invention uses whole corn kernels to form a toasted corn flavor additive ("TCF"). The germ portions of the corn need not be isolated from the rest of the corn components. However, TCF can still be formed from individual parts of corn kernels or combinations thereof.

FIG. 1 is a flow chart of a process 100 for making TCF in accordance with one or more embodiments of the present invention. The overall process 100 can be summarized as follows: 1) whole corn kernels are cooked in a solution of lime and water; 2) the corn is steeped and allowed to cool; 3) the corn is drained and washed; 4) the corn is ground, sheeted and cut into pieces; 5) the pieces are toasted with the assistance of infrared radiation and a hot oven until significant browning has occurred beyond the level normally associated with consumed masa products; and 6) the toasted pieces are then ground into particles which can then be administered as toasted corn flavor additive. These steps can be performed in either a batch or continuous process.

In the first stage 110 of the process 100 shown in FIG. 1, dry whole corn kernels 102 are introduced into a solution of water and lime (calcium hydroxide) 112. While the exact concentration of lime is not particularly critical to the present invention, the concentration is such that the pH of the solution typically ranges from about 10 to about 14. The corn 102 is then cooked in the lime-water solution 112 near but below the boiling point for a time ranging from a few minutes to about an hour. Typical cooking temperatures range from about 70° C. to about 100° C. However, higher temperatures can be used if the cooking step 110 is performed under pressure. Cooking the corn 102 in the lime-water solution 112 helps soften the kernels 102 and loosen the outer pericarp (bran) layers. It also causes the cell walls and fiber components to swell and weaken, as well as partially gelatinize the starchy endosperm.

In the soaking/steeping stage 120, the mixture of corn and lime-water 115 is allowed to cool and steep for a period of time ranging from about 8-12 hours. Steeping causes further loosening of the pericarp, softening of the kernels, swelling and weakening of the cellular structures, and gelatinizing of the endosperm.

In the draining stage 130, the excess lime-water solution, loose pericarp and other solubilized material 132 are drained from the steeped mixture 125. The solution to be drained 132 is often called "nejayote." The draining stage 130 typically comprises sifting the corn kernels 135 over a sieve or other mesh-type barrier. However, other methods of separating the kernels 135 from the steeped mixture 125 can be used.

The corn kernels 135 are then washed with water 142 in a washing stage 140 to remove any lime-water, loose pericarp and other solubilized substances 144 that remain entrained. Alternatively, the draining and washing stages 130, 140 can be combined into one process step. For example, as the corn kernels 135 are sifted over a sieve and the lime-water 132 drains through the sieve, water 142 can also be fed over the kernels 135 to enhance the removal of loosened pericarp and dissolved particles 144. After the cooking, soaking, draining and washing stages 110, 120, 130, 140, up to about 15% by weight of the starting corn fraction will have been lost. (Unless otherwise stated, all fractions and percentages expressed herein are by weight.) At this point, the corn 145 has a moisture content of roughly 50% by weight.

Next, the lime-treated wet corn kernels 145 (called "nixtamal") proceed to a grinding stage 150. The corn 145 can be ground or milled in numerous ways. For example, the corn 145 can be ground with an apparatus as simple as a mortar and pestle. For commercial purposes, industrial grinders can be used to mill large quantities of wet corn. Grinding and milling processes are well known in the art and need not be described in detail herein. The grinding disrupts the corn kernels' cellular structures and releases the starchy endosperm, causing the mixture 145 to thicken. If necessary, water can be added to ensure that the mixture 145 forms into wet (or "fresh") masa dough 155. The ground mixture 155 typically has a moisture content of approximately 30-50% by weight. However, the moisture content may vary depending on the length of cooking and steeping time, as well as the type of grinding method used.

Although FIG. 1 depicts one embodiment in which corn kernels are cooked, steeped, drained, washed and ground to produce fresh nixtamilized dough ("fresh masa dough" or "wet masa dough"), the dough can be produced using other methods. For example, a mixture of milled whole corn kernels, lime and water can be extruded and heated in an extrusion or kneading chamber to form masa dough. This method and other methods for forming fresh masa dough known in the art provide viable substitutes for the one or more of the first five stages depicted in FIG. 1.

After the nixtamilized corn 145 has been formed into dough 155, it proceeds to a sheeting/cutting stage 165 where it is sheeted and cut into pieces 165. The sheeting can be accomplished by passing the ground mixture 155 through one or more rollers or presses. The fresh masa dough 155 can be sheeted to a thickness ranging from about 0.1 mm to about 2.0 mm, but more preferably from about 0.3 mm to about 1.0 mm. In the preferred embodiment, the masa dough 155 is sheeted to a thickness of approximately 0.65 mm. Once formed into a flat sheet, the sheeted mixture is then cut into manageable pieces 165 (TCF preforms). If desired, the sheeting and cutting steps can be combined into the same apparatus so that the sheeting and cutting occur essentially simultaneously. As sheeting and cutting methods are well known in the art, they need not be described in detail herein.

The TCF preforms 165 are then toasted in a toasting stage 170. TCF preforms 165, however, are toasted to a much greater extent than that to which corn masa preforms are normally toasted while forming a consumable corn tortilla chip. The toasting stage 170, involves exposing the preforms 165 to conductive, convective and/or radiant heat. Conductive heat is heat that is transferred to the food by direct contact with a heated medium. Convective heat is heat that is transferred to the food by currents of hot air. Radiant heat is heat that is transferred from hot surfaces to the food via radiation (light rays).

In the preferred embodiment, all three types of heat are employed. However, it is not necessary to use all three types of heat, and alternative methods can be used to obtain the desired level of toasting. For example, in one set of embodiments, only one of the three types of heat is used. In yet another set of embodiments, various combinations of two of the three types of heat are used.

Direct conductive heat can be applied to the preforms 165 in the toasting stage 170 by placing the preforms 165 directly on a hot oven pan or passing them along a hot conveyor belt through an oven. The direct heat provided by such a pan or conveyor belt helps form toast points on the preform bottom surfaces that are touching the pan or belt. Other methods of providing conductive heat include, but are not limited to, directly contacting the preforms 165 with heated ceramic hearthstone, firebrick or composite hearth.

A convective heat source can be provided from any cooking device in which currents of hot air transfer heat to the surface of the food. Ovens or toasters using natural or forced convection can be used. For example, an impingement oven (or hot-air jet oven), such as that manufactured by Enersyst Development Center, can be used to provide convective heat. Impingement ovens typically use ported manifolds to direct jets of air onto the product surfaces. These jets of air disturb the boundary layer of air and moisture that insulate the product, thus quickening the cooking process.

An infrared oven or burner can also be used in the toasting stage to further brown the preforms and cause toast points to form on the sides exposed to the infrared radiation. An infrared burner typically comprises a plurality of porous ceramic plates or metal screens upon which premixed air and gases are combusted. The combustion imparts high surface temperatures to the infrared burner, which can often reach 1800° F., and causes the burner to emit radiant heat. Infrared ovens can be obtained from manufacturers such as the Radiant Technology Corporation.

Alternatively, combination ovens such as a hot-air/infrared oven manufactured by Glenro Inc. can also be employed. Such ovens provide various combinations of conductive, convective and radiant heat simultaneously without modification. By combining two or more types of heat in one oven, residence times in the toasting stage 170 can be sharply reduced, and toasted flavors and colors can be formed more effectively.

In the toasting stage 170, the TCF preforms 165 are cooked to reduce the moisture from roughly 50% by weight to a moisture content ranging from about 0.5% by weight to about 15% by weight, depending on the desired amount of browning and toasted flavor. In the preferred embodiment, the TCF preforms 165 are cooked to reduce the moisture content to approximately 1% by weight. The TCF preforms 165 are cooked to form toasted TCF pieces 175 (or "flavor pieces") until there is significantly more browning than in typical corn tortilla chips that would be offered to consumers. It is important to note, however, that while the final moisture content is an indication of the amount of browning and the toast-point density that has been produced, other processing conditions affecting browning must also be considered. For example, it is possible to gently dehydrate preforms 165 to a low moisture content without producing significant amounts of browning. Conversely, it is also possible to rigorously heat preforms 165 to cause significant amounts of browning even though the moisture content is still relatively high. Thus, the temperature gradients and the rate of dehydration must be controlled to create the desired level of browning.

If desired, the TCF preforms can be fried in hot oil after being toasted in a toasting stage 170. Thus, in another embodiment, the sheeted and cut TCF preforms are first toasted to reduce the moisture level and impart a toasted color and flavor to the preforms. Then the preforms and fried in hot oil to further reduce the moisture content to the desired level.

After grinding, sheeting, cutting and toasting (and frying, if applicable), the browned TCF pieces 175 then proceed to another grinding stage 180 where they are reground into granules/particles or a powder 185. This powder or "regrind" can be used as toasted corn flavor additive for enhancing the taste and appearance of food products, especially those derived from dry masa flour. Various grinding methods and apparatuses can be used depending on the desired properties of the resulting additive ("regrind") 185. For example, an industrial grinder such as one manufactured by Urschel Laboratories, Inc. can mill the TCF pieces 175 into particles of various sizes.

The resulting TCF particles have an ash content higher than that normally found in consumable products. They have a moisture content of about 0.1% to about 15% by weight, more preferably from about 0.5% to about 6%. The TCF particles have an oil content of about 2.0% to about 5.0% by weight, more preferably from about 3.0% to about 4.0%. The distribution of particles sizes is such that roughly 75% or more of the particles have U.S. mesh sizes between 16 and 50 (300-1180 microns), more preferably a distribution of coarse particles (or particulates) having an average U.S. mesh size of 20 (850 microns) and fine particles (or particulates) having an average U.S. mesh size of 40 (425 microns).

Whereas prior art corn flavor additives and product methods use only the germ portions of corn, which must be separated from the other components, a toasted corn flavor additive in accordance with the present invention uses whole corn kernels. Thus, the composition and physical properties of TCF are significantly different from those of prior art corn germ additives. FIG. 7 is a chart comparing the moisture, oil, and color levels of one embodiment of TCF, Cargill Flavor Enhancer #10 (a commercially available corn germ flavor additive), and Lifeline Masa (a commercially available dry corn masa). Whereas the particular embodiment of TCF tested had a moisture content of 1.70% by weight, the Cargill Flavor Enhancer and Lifeline Masa had higher moisture levels of 7.44% and 9.84% by weight, respectively. The TCF and Lifeline Masa both had an oil content of less than 4% by weight, whereas the Cargill Flavor Enhancer had a significantly higher oil content of 24.20% by weight.

Figure 10:
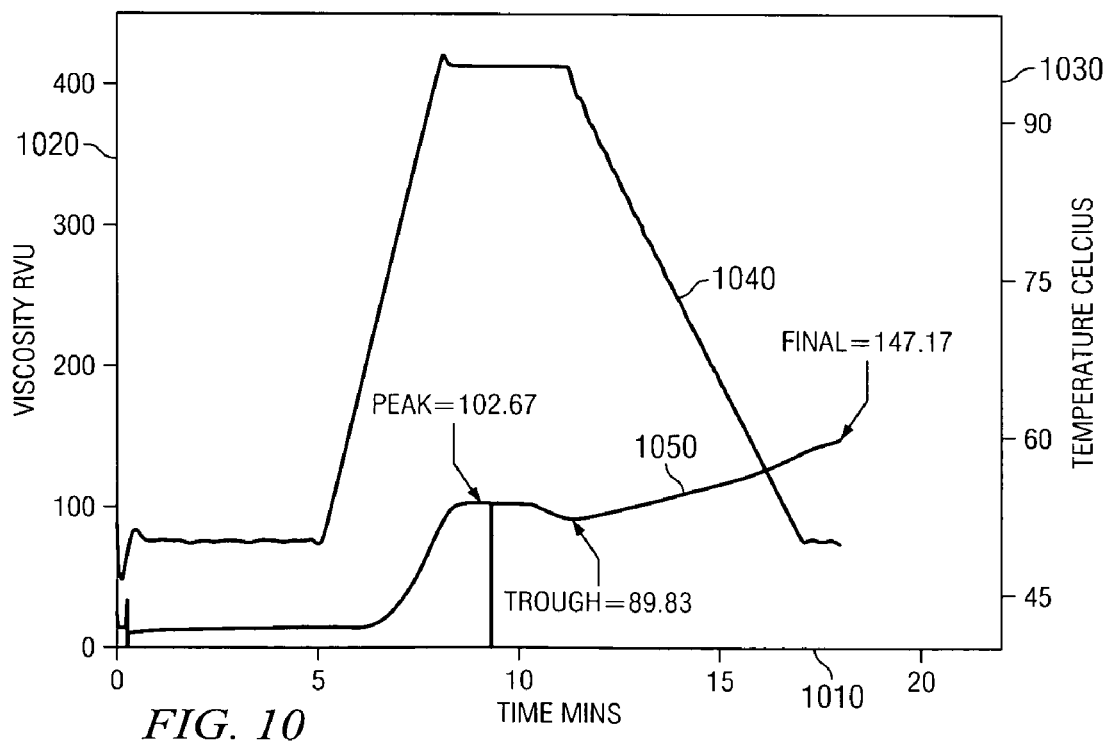

FIGS. 8, 9 and 10 are charts showing the results of rapid-viscosity-analysis tests performed on samples of Cargill Flavor Enhancer #10 (a commercially available corn germ flavor additive), Lifeline Masa (a commercially available dry corn masa), and TCF additive made in accordance with the present invention, respectively. The results were obtained using a Rapid Visco Analyzer manufactured by Newport Scientific, Narrabeen, Australia. In FIGS. 8, 9 and 10, the horizontal axes 810, 910, 1010 measure the elapsed time in minutes, the left vertical axes 820, 920, 1020 measure the viscosities of the test samples in rapid viscosity units (RVU), and the right vertical axes 830, 930, 1030 measure the temperatures of the test samples in centigrade. An aqueous slurry of each sample was held at 50° C. for five minutes, heated at 15° C./minute to 95° C., held at 95° C. for three minutes, and cooled at 7.5° C./minute to 50° C. FIGS. 8, 9 and 10 show the temperature profiles 840, 940, 1040 for each of the samples throughout the 17-minute tests. In FIG. 8, the viscosity of the Cargill Flavor Enhancer remained relatively constant with RVU levels below 10.0. In contrast, FIG. 9 shows that the viscosity 950 of the Lifeline Masa sample quickly and dramatically increased with temperature to a first peak of 284 RVU, slightly decreased before the temperature began to decrease, and then gradually increased to an even higher peak of 412 RVU as the temperature returned to 50° C. This behavior is typical of food substances with high levels of starch, since starch molecules gelatinize and become more viscous as they are hydrated and heated. As seen in FIG. 10, the TCF sample exhibited similar results, although not quite as dramatic as the Lifeline Masa (dry corn masa). The viscosity of the TCF sample increased rapidly with rising temperature from roughly 20 RVU to a first peak of 102.67 RVU, then decreased to 89.83 RVU before increasing to an even higher peak of 147.17 RVU. This similar but less dramatic behavior confirms the fact that while TCF additive contains starch, much of the starch has already been cooked and has contributed to browning reactions during toasting.

A method in accordance with the present invention causes significant browning to occur in the additive, thereby giving the additive a dark color. The right-most column shown in FIG. 7 contains L-values that were measured using a Hunter-Lab calorimeter. The TCF sample had a significantly lower L-value (L-value of 49.2) than the Cargill Flavor Enhancer (L-value of 64.1) and the Lifeline Masa (L-value of 78.4). As L-values measure the lightness of a sample, the TCF sample's lower L-value demonstrates that TCF additive is darker in color than dry corn masa and corn germ flavoring. Thus, when added to a product to be enhanced, the embodiment of TCF described in FIG. 7 adds a darker, toasted color to the product and also gives such product the appearance of having toast points. Accordingly, other embodiments of TCF additive can also add a darker, toasted color and appearance to dry masa corn products as long as the TCF additive has a colorimeter L-value less than that of dry masa.

Figure 11:
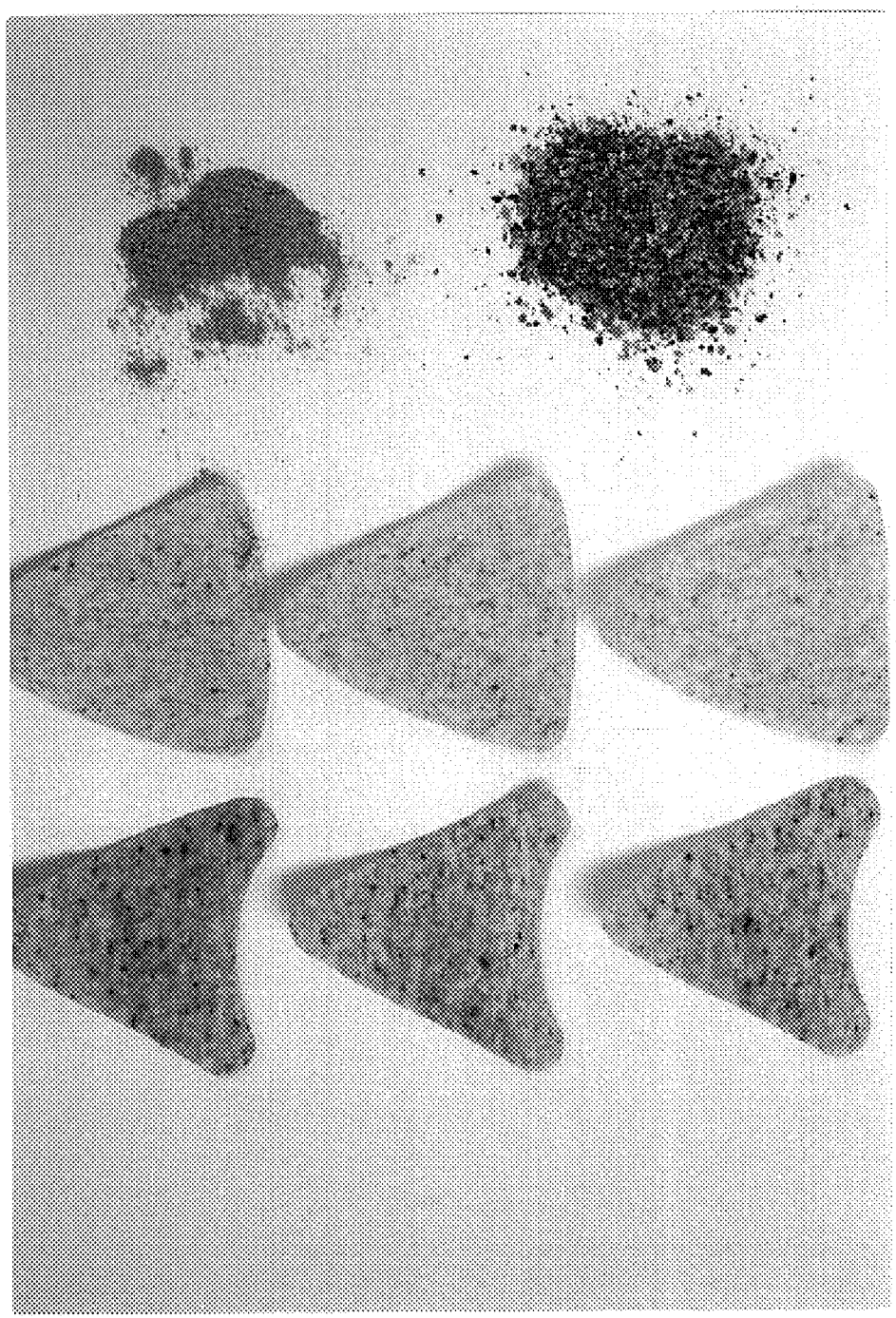
FIG. 11 is a color photograph showing from top to bottom: TCF additive (fine and coarse particles); fried dry masa chips without TCF additive; and fried dry masa chips with TCF additive.

Depending on the particle size of the TCF additive used and the method used to apply it to the product to be enhanced, the TCF additive can either give the finished product the appearance of having natural toast points dispersed throughout, give the product a consistent darker color, or both. For example, fine particles of TCF additive can be added to dry masa dough to give the final cooked corn product a darker color and can give the product surface a more complex, multi-toned appearance. Coarse particles of TCF additive, which serve as artificial toast points, can also be added onto sheeted and cut pieces of dough made from dry masa to give the final cooked product the appearance of having natural toast points. FIG. 11 is a color photograph showing three rows of items from top to bottom: TCF additive (fine and coarse particles); fried dry masa chips without TCF ("non-TCF-enhanced" chips); and fried dry masa chips with TCF additive ("TCF-enhanced" chips). As seen in FIG. 11, the TCF-enhanced chips have a darker, more complex yellow color than the non-TCF-enhanced chips. The TCF-enhanced chips also have a higher density of toast points than the non-TCF-enhanced chips. These characteristics give the TCF-enhanced chips an enhanced toasted appearance. In addition, both the fine and the coarse particles enhance the toasted corn flavor of products containing the additive.

Although the toasted flavor additive discussed above relates specifically to corn-flavored products, other toasted flavor additives can be manufactured in a similar manner. For example, cereal grain products that are already toasted to some degree in the manufacturing process can simply be toasted to a much higher degree and ground to make a toasted-flavor additive. This additive can then be added back into the normal manufacturing process to enhance the toasted flavor of the cereal product. Toasted-flavor additives are particularly useful for manufacturing processes that either limit or cannot accommodate toasting. Oven-puffed cereals, for instance, are typically made by passing preconditioned whole grains (usually wheat or rice) through an oven for partial toasting and puffing. Such products, however, cannot be toasted beyond a certain degree because a high degree of toasting would inhibit puffing. Preconditioned wheat or rice grains can be heavily toasted and then ground to make a toasted flavoring that can then be added to the normal manufacturing process to enhance the toasted flavor. Furthermore, this method for enhancing the toasted flavor of foods also encompasses the recycling and toasting of scraps, lace, and waste from a given food manufacturing line in order to form a toasted-flavor additive.

TCF-Enhanced Corn Products Derived from Dry Masa

Toasted corn flavor additive ("TCF" or "regrind") can be used to enhance the flavor and appearance of many food products. In particular, TCF can be used to enhance the toasted corn flavor of corn chips (or crisps) made from dry masa flour. The dark-colored TCF grains also serve as artificial toast points and give corn chips the appearance of having natural toast points. These toast points help give dry-masa corn chips a toasted appearance more similar to that of toasted fresh-masa corn chips. In an exemplary embodiment, untoasted, fried corn chips with TCF exhibit nearly the same toasted corn flavor as regular corn tortilla chips that are toasted and fried. The TCF-enhanced corn chips also more closely resemble regular tortilla chips than non-TCF-enhanced corn chips.

FIG. 2 is a flow chart of a method 200 for making corn tortilla chips from dry masa flour and using TCF to enhance the flavor and appearance of such chips in accordance with one or more embodiments of the present invention. First, dry masa flour and water 202 are introduced into a first mixing stage 210 where the flour and water 202 will be mixed and tumbled or kneaded to form preconditioned masa 215. Thus, this first mixing stage can also be called a preconditioning stage. The mixing in the first mixing stage 210 can be accomplished with any batch or continuous dough mixer. For large commercial applications, industrial mixers can be used. Typically, the weight ratio of dry masa flour to water ranges from about 2:1 to about 5:1. Typical residence times in the first mixing stage 210 range from about 5 to about 30 minutes and more preferably from about 10 to about 20 minutes. This residence time helps give the water an opportunity to soak into the masa particles.

After the masa flour and water 202 have mixed for a sufficient amount of time to allow the dry masa to absorb the water, other ingredients such as sugar, emulsifiers and preservatives 222 can be added in a second mixing stage 220. However, the second mixing stage 220 need not be included if no other ingredients other than TCF will be added. The second mixing stage 220 can occur in the same mixing apparatus, or it can take place in a separate apparatus such as any one of the mixers described with respect to the first mixing stage 210. The other ingredients 222 may include but are not limited to the following: sugar, salt, emulsifiers, lecithin, lime, vegetable gums, fumaric acid, ascorbic acid, citric acid, cottonseed oil, sunflower oil, vegetable oil, soybean oil, and modified food starch. After the desired other ingredients 222 are mixed for up to a minute or as long as is necessary to evenly disperse the ingredients, a small amount of water is added to the mixing ingredients to further enhance the absorption and dispersion of the ingredients throughout the masa dough 225. The dough 225 continues to mix for a few minutes, more preferably for about one to three minutes, until the dough 225 has absorbed the additional water.

While it is possible to add TCF along with the other ingredients 222 during the second mixing stage 220, it is more preferable to add TCF as late as possible in the mixing stages in order to reduce the amount of time that the TCF is in contact with the moist dough before cooking. This is because moisture from the masa dough causes the dark toasted colors of the TCF granules to bleed into the surrounding dough. Such bleeding is visually undesirable in the cooked product.

After all ingredients other than TCF have been added and mixed, TCF granules or particles 232 are gently mixed into the masa dough 225 in the third mixing stage 230. Like the second mixing stage 220, this mixing stage 230 can occur in the same mixing apparatus, or it can take place in a separate apparatus. The amount of TCF added will depend on the moisture content of the TCF, the level of toasting in the final product, as well as the desired final product characteristics. The TCF added 232 can comprise about 0.1% to about 10% by weight of the dough basis, more preferably about 1.7% to about 4.0% by weight. The TCF 232 is mixed for up to a minute or so until it is uniformly dispersed throughout the dough 235.

As soon as the TCF 232 is uniformly dispersed, the TCF-enhanced dough 235 proceeds to a sheeting/cutting stage 240 where it is sheeted and cut into the desired preform shapes 245. The TCF-enhanced dough 235 can be sheeted by passing it through one or more rollers or presses. The dough 235 can be sheeted to a thickness ranging from about 0.1 mm to about 2.0 mm, more preferably from about 0.3 mm to about 1.0 mm. In the preferred embodiment, the masa dough 235 is sheeted to a thickness of approximately 0.65 mm. Once formed into a flat sheet, the sheeted mixture is then cut into the desired snack piece shapes 245 ("preforms"). If desired, the sheeting and cutting steps can be combined into the same apparatus so that the sheeting and cutting occur essentially simultaneously. As sheeting and cutting methods are well known in the art, they need not be described in detail herein.

Once sheeted and cut, the preforms 245 proceed to a cooking stage 250 to be baked and/or fried. Before cooking, the preforms 245 typically have a moisture content of about 50% by weight. The preforms 245 are cooked in either a batch or continuous manner until the moisture level has decreased to approximately 3% by weight or lower. However, higher moisture levels are acceptable if the product will be consumed fairly soon after cooking. In the preferred embodiment, the preforms 245 are first baked in an air impingement oven for about 15-30 seconds at approximately 550-600° F. Then the preforms 245 are fried in hot oil having a temperature of about 350-400° F. for approximately 1-3 minutes until the moisture content decreases to below 3% by weight. Baking the preforms 245 before frying helps remove excess moisture that might cause blistering during frying. However, it is also possible to fry the preforms 245 directly without a preceding baking step. While a preferred embodiment of a cooking stage 250 has been described, other embodiments for cooking masa dough are possible. Many methods for cooking masa dough to form cooked corn tortilla chips are well known in the art and need not be described in detail herein.

The TCF-enhanced dry-masa corn tortilla chips 255 exiting the cooking stage shown in FIG. 2 have visual and flavor characteristics that are more desirable than non-TCF-enhanced dry-masa tortilla chips. Unlike traditional dry-masa tortilla chips, which tend to have bland corn flavors and homogenous colors, TCF-enhanced dry-masa tortilla chips 255 have a toasted corn flavor and contain dark specks (dispersed TCF particles) that resemble natural toast points. It has been shown that consumers find chips having toast points and a toasted corn flavor more desirable than those having a homogenous appearance and a bland corn flavor.

While FIG. 2 illustrates one method for forming corn tortilla chips incorporating TCF, other methods are possible, and the present invention is not limited to the embodiments described herein.

In one exemplary embodiment, a fried, untoasted corn masa product containing TCF was formed by mixing, sheeting, cutting, and frying a mixture of 12.5 lbs of preconditioned dry masa, 7.0 lbs of starch, 1.32 lbs of TCF additive, 0.06 lbs of emulsifier, 4.50 lbs of water, and 1.0 lbs of other ingredients. FIG. 3a lists these ingredients and their amounts in tabular form. 10.25 lbs of dry masa and 2.25 lbs of water were mixed in a Foreberg Mixer for approximately 20 minutes to form preconditioned masa. The preconditioned masa, starch, TCF additive, emulsifier, and other ingredients were dry-mixed in a Stephan Mixer for about 30 seconds. Then water was added to the mixture, and the mixture was stirred for an additional minute to form a dough. The dough was sheeted, cut, and fried in hot oil to form corn chips until the moisture content decreased to 1.2% by weight. The resulting product had the following composition, which is also listed in tabular form in FIG. 3b (percentages expressed by weight): 36.4% dry corn masa; 26.7% starch; 3.7% TCF; 0.05% emulsifier; 27.9% oil; a moisture content of 1.2%; and other additives for the remaining fraction.

In flavor optimization method tests ("OMT") for toasted corn flavor, the fried, untoasted TCF-enhanced product came in at parity with a control sample of tortilla chips that were formed from wet masa, toasted and fried in a typical manner. FIGS. 4a and 4b show the flavor OMT results after comparing the toasted flavor levels of standard tortilla chips to those of untoasted dry masa chips with and without TCF additive. When interpreting OMT results, mean values that share the same superscript letter are not significantly different, whereas mean values that have differing letters are detectably different. The p-value represents the probability that the finding was due to chance alone. P-values of less than 0.05 are often considered significant, while p-values of greater than 0.10 are considered not significant.

FIG. 4a shows the flavor OMT results after comparing the level of toasted flavor of standard tortilla chips, which are toasted and fried, to the level of toasted flavor in untoasted dry masa chips, which are only fried. The standard tortilla chips had a higher mean value than the untoasted dry masa chips (standard 4.39 versus untoasted 3.94), and the two test samples were marked with different letters. Furthermore, the p-value of 0.01 shows that the test results were not due to chance alone. Thus, one can see that untoasted dry masa chips had a noticeably lower level of toasted flavor than standard tortilla chips.

FIG. 4b shows the flavor OMT results after comparing the level of toasted flavor of standard tortilla chips to the level of toasted flavor in untoasted dry masa chips with TCF additive. Both the standard chips and the untoasted TCF-enhanced chips had similar values (standard 2.4 versus untoasted TCF-enhanced 2.2) and shared the same letter. Furthermore, the p-value of less than 0.001 confirms that the results were not due to chance alone. Thus, one can see that the TCF additive gave the untoasted product a level of toasted flavor that was nearly identical to that of standard toasted tortilla chips.

In addition, product samples of untoasted, TCF-enhanced corn masa products contained twice as much dimethyl-ethyl-pyrazine as control samples of similar products made without TCF. Research has shown that various aromatic compounds such as methional, various pyrazines and pyrrolines, are associated with toasted corn flavor in foods. See Silvia, M. A. A. P. da, *Flavor Properties and Stability of a Corn-based Snack: Aroma Profiles by Gas Chromatography (GC), GC-olfactometry, Mass Spectrometry, and Descriptive Sensory Analysis*, Oregon State Univ., Corvallis, Oreg. 97331, USA, Dissertation Abstracts International, B 1994, thesis publ. 1993, 54. Dimethyl-ethyl-pyrazine is one such aromatic compound associated with toasted corn flavor. Thus, the compound concentrations in foods can be used as an indicator of toasted corn flavor. FIG. 5 is a graph comparing the concentrations of dimethyl-ethyl-pyrazine found in standard toasted tortilla chips, untoasted dry masa chips without TCF additive, and untoasted dry masa chips with TCF additive. The results shown in FIG. 5 were obtained by gas-chromatography/mass-spectrometry analysis (GC/MS). The vertical or y-axis of the graph in FIG. 5 measures the concentration of dimethyl-ethyl-pyrazine in parts-per-million (ppm), while the horizontal or x-axis contains four vertical bars that represent the dimethyl-ethyl-pyrazine concentrations of four test samples. Reading from left to right, the four vertical bars represent the dimethyl-ethyl-pyrazine levels in standard toasted tortilla chips 510, untoasted dry masa chips 520, a first sample of untoasted dry masa chips having TCF additive 530, and a second sample of untoasted dry masa chips having TCF additive 540. Although the dimethyl-ethyl-pyrazine concentrations in the two TCF-enhanced samples 530, 540 were still significantly lower than the concentration in standard toasted tortilla chips 510, the dimethyl-ethyl-pyrazine concentrations of the two TCF-enhanced samples 530, 540 were more than double the amount present in the non-TCF-enhanced chips 520. Thus, the higher levels of dimethyl-ethyl-pyrazine demonstrate a significant increase in toasted corn flavor with the use TCF additive.

FIG. 6 is a flow chart of a method 600 for making an extruded corn snack food, such as corn chips, from dry masa flour and using TCF to enhance the flavor and appearance of such a snack food in accordance with one or more embodiments of the present invention. First, dry masa flour, water and/or steam, and other ingredients 602 are introduced into a preconditioning stage 610 where the flour, water and/or steam, and other ingredients 602 will be mixed until the mixture is fairly homogenous. The other ingredients may include but are not limited to the following: sugar, salt, emulsifiers, lecithin, lime, vegetable gums, fumaric acid, ascorbic acid, citric acid, cottonseed oil, sunflower oil, vegetable oil, soybean oil, and modified food starch. The mixing can be accomplished with any batch or continuous dough mixer. For large commercial applications, industrial mixers can be used. Typically, the weight ratio of dry masa flour to water ranges from about 2:1 to about 5:1. Typical residence times in the preconditioning stage 610 range from about 5 to about 30 minutes and more preferably from about 10 to about 20 minutes. This residence time helps give the water an opportunity to soak into the masa particles. It also gives all of the other ingredients time to be evenly dispersed.

While it is possible to add TCF along with the other ingredients during the preconditioning stage shown in FIG. 6, it is more preferable to add TCF as late as possible in the process before cooking in order to reduce the amount of time that the TCF is in contact with the moist dough before cooking. This is because moisture from the masa dough causes the dark toasted colors of the TCF granules to bleed into the surrounding dough. Such bleeding is visually undesirable in the cooked product.

After preconditioning, the preconditioned mixture 615 of masa flour, water and other ingredients proceeds to an extruding stage 620 where it is extruded until homogenous dough or cooked product 625 is formed. Extruding for a short period of time and at fairly low temperature and pressure will result in homogenous dough, whereas extruding for a longer period of time and at higher temperature and pressure will both form and cook the resulting dough. In the preferred embodiment of the method shown in FIG. 6, a twin-screw extruder is used to mix and knead the mixture into homogenous dough. The high shear forces created by the extruder create heat which helps partially cook the mixture. The extruder can comprise one section, or it can alternatively comprise two or more sections. For example, when forming puffed corn chip products, the extruder can comprise two sections: a first section having low shear and low compression for gently mixing and blending the entering mixture 615; and a second section having high shear and high compression for kneading the mixture into a dough. Additional heat can be supplied to the extruder in order to cook the mixture 615. When the mixture/dough 625 exits the second section of such an extruder, the sudden release of pressure and steam, which forms from the heat generated by the high shear stress and any other supplied heat, causes the dough or product 625 to expand and puff outward. When forming non-puffed, extruded corn snack foods, the extruder may have an additional third section having low shear stress in which the dough or product 625 is cooled prior to discharge. Cooling the hot masa dough or product 625 before discharge helps prevent it from expanding upon exiting the extruder.

In order to limit TCF 622 exposure to moisture before cooking, TCF granules 622 are added as late as possible in the mixing and cooking process before cooking while still giving the TCF granules 622 an opportunity to evenly disperse throughout the dough 625. High temperatures, high pressures and moist conditions within an extruder increase the rate at which TCF particles 622 and pigments undesirably disintegrate and bleed into masa dough 625. Thus, in the preferred embodiment, TCF 622 is not added until the latter portion of the extrusion process.

After exiting the extruding stage 620, the extruded dough 625 is then sheeted and/or cut into preforms 635 in a sheeting/cutting stage 630. Depending on the type of product to be formed, the dough 625 may or may not need to be sheeted. For example, where the extruder is used to create a cooked, puffed corn product, the product can simply be cut into discrete pieces after exiting the extruder. However, if the dough 625 will be used to form tortilla chips, for example, it must be sheeted and cut.

If the snack products 635 were not fully cooked during the extruding stage 620, the snack products 635 are then sent to a cooking stage 640 as shown in FIG. 6. Before cooking, the preforms 635 typically have a moisture content of about 30-50% by weight. The preforms 635 are cooked in either a batch or continuous manner until the moisture level has decreased to approximately 3% by weight or lower. This cooking stage 640 can be accomplished in the same manner as described above with respect to the cooking stage 250 shown in FIG. 2. After cooking 640 and/or cutting 630, the snack products 635 can then be cooled and then served immediately or packaged for later consumption.

The TCF-enhanced dry-masa snack products 645 exiting the cooking stage 640 shown in FIG. 6 have visual and flavor characteristics that are more desirable than non-TCF-enhanced dry-masa snack products. Unlike traditional dry-masa snack products, which tend to have bland corn flavors and homogenous colors, TCF-enhanced dry-masa snack products 645 have a toasted corn flavor and contain dark specks (dispersed TCF particles) that resemble natural toast points. It has been shown that consumers find corn snack products having toast points and a toasted corn flavor more desirable than those with a homogenous appearance and a bland corn flavor.

While FIG. 6 illustrates one method for forming an extruded corn snack food incorporating TCF, other methods are possible, and the present invention is not limited to the embodiments described herein.

With the use of toasted corn flavor additive in accordance with the invention, food products can be given a toasted corn flavor, as well as the appearance of having toast points. In particular, the visual characteristics and taste of untoasted or lightly-toasted corn products made from dry or wet masa can be significantly enhanced. Whereas untoasted or lightly-toasted corn products typically have a bland corn flavor and an overly homogenous appearance, toasted corn flavor additive imparts a toasted corn flavor and a toasted appearance to an otherwise bland-tasting and homogenous-looking product. Toasted corn flavor additive also is easily manufactured with existing processes for making corn tortilla chips and is readily incorporated into existing processes for making corn products derived from masa flour.

The novel method for adding or enhancing a toasted flavor also applies to other grains and starch-based foods. Furthermore, this method for enhancing the toasted flavor of foods also encompasses the recycling and toasting of scraps, lace, and waste from a given food manufacturing line in order to form a toasted-flavor additive.

While the invention has been particularly shown and described with reference to a preferred embodiment, it will be understood by those skilled in the art that various changes in form and detail may be made therein without departing from the spirit and scope of the invention.

We claim:

1. A toasted corn flavor additive comprising a regrind of toasted, sheeted, freshly-made masa dough derived from ground whole corn kernels, wherein said regrind has:
   an oil content of about 2.0% to about 5.0% by weight;
   a dimethyl-ethyl-pyrazine concentration such that if said regrind was mixed with a sample of untoasted dry masa chips, said regrind would enable the resulting mixture to exhibit a dimethyl-ethyl-pyrazine concentration of about 0.05 ppm;
   a colorimeter L-value of approximately 49;
   a moisture content ranging from about 0.1% to about 15% by weight.

2. The toasted corn flavor additive of claim 1 wherein said regrind is in the form of a powder comprising a plurality of particles, and further wherein at least about 75% of the particles have U.S. mesh sizes between about 26 and about 50.

3. The toasted corn flavor additive of claim 2 wherein said particles comprise coarse particulates and fine particulates, and further wherein said coarse particulates have an average U.S. mesh size of about 20 and said fine particulates have an average U.S. mesh size of about 40.

4. The toasted corn flavor additive of claim 1 wherein said additive has a moisture content ranging from about 0.5% to about 6% by weight.

5. The toasted corn flavor additive of claim 1 wherein said sample of untoasted dry masa chips has a dimethyl-ethyl-pyrazine concentration of 0.023 ppm.

6. A method for making a toasted corn flavor for dry masa flour, said method comprising the steps of:
   a) forming a fresh masa dough;
   b) sheeting said fresh masa dough;
   c) cutting said dough into a plurality of flavor preforms;
   d) toasting said flavor preforms to form a plurality of toasted flavor pieces having a moisture content ranging from about 0.5% by weight to about 15% by weight; and
   e) grinding said toasted flavor pieces into a powder to form a toasted corn flavor additive having: a dimethyl-ethyl-pyrazine concentration such that if said toasted corn flavor additive was mixed with a sample of untoasted dry masa chips, said toasted corn flavor additive would enable the resulting mixture to exhibit a dimethyl-ethyl-pyrazine concentration of about 0.05 ppm; a colorimeter L-value of approximately 49; and an oil content ranging from about 2.0% to about 5.0% by weight.

7. The method for making a toasted corn flavor additive of claim 6 wherein said forming a fresh dough in step a) further comprises:
   i) cooking a plurality of whole corn kernels in a solution of water and lime;
   ii) steeping said kernels in said solution;
   iii) draining said solution from said kernels;
   iv) washing said kernels; and
   v) grinding said kernels to form a fresh masa dough.

8. The method for making a toasted corn flavor additive of claim 6 wherein said forming a fresh masa dough in step a) further comprises extruding a plurality of whole corn kernels with a solution of water and lime to form a fresh masa dough.

9. The method for making a toasted corn flavor additive of claim 6 wherein said sheeting of step b) and said cutting of step c) are performed simultaneously.

10. The method for making a toasted corn flavor additive of claim 6 wherein said toasting of step d) farther comprises applying convective and radiant heat to said flavor preforms.

11. The method for making a toasted corn flavor additive of claim 10 wherein said radiant heat comprises infrared radiation.

12. The method for making a toasted corn flavor additive of claim 6 wherein said toasted flavor pieces have a moisture content of about 1.0% by weight.

13. A toasted corn flavor additive made from the method of claim 6.

* * * * *